June 11, 1957     J. ERANOSIAN     2,795,684
FOOD WARMING CABINET
Filed Dec. 27, 1954
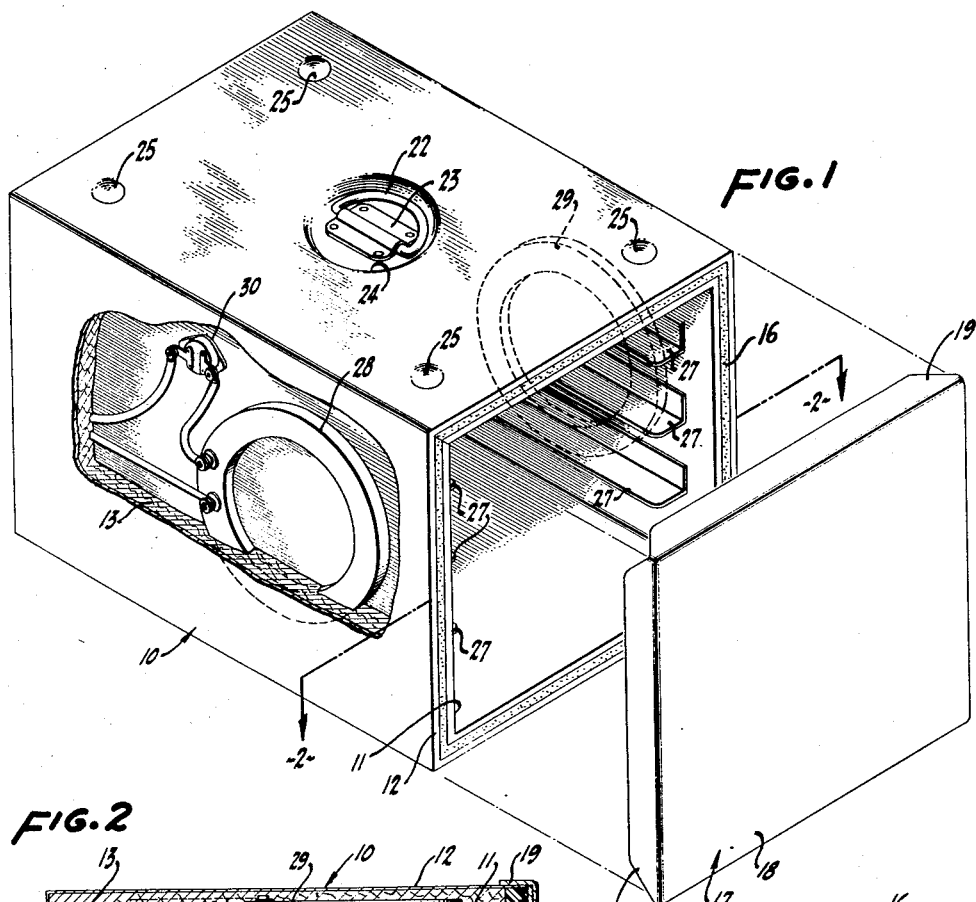
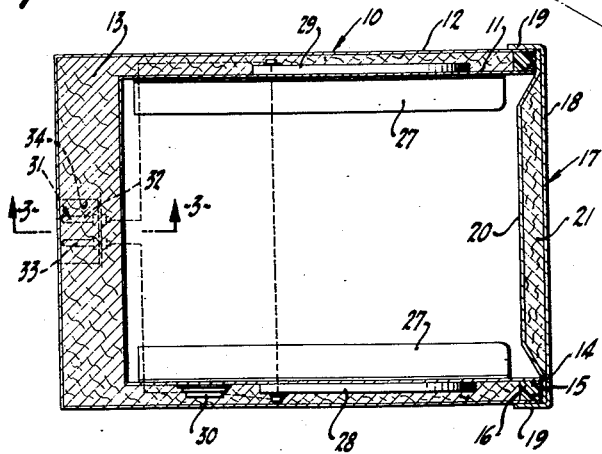
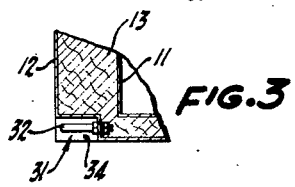
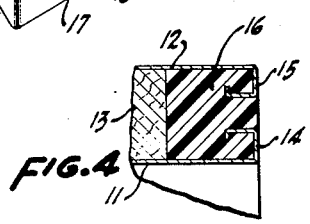
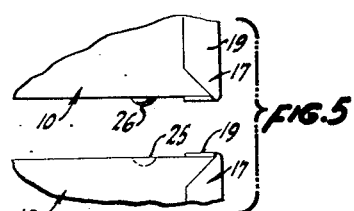
INVENTOR.
JOHN ERANOSIAN
BY
*Meelin and Hanscom*
ATTORNEYS United States Patent Office 2,795,684
Patented June 11, 1957

2,795,684
FOOD WARMING CABINET
John Eranosian, Woodside, Calif.
Application December 27, 1954, Serial No. 477,914
1 Claim. (Cl. 219—35)

This invention relates to a food warmer, and more particularly is directed to a thermostatically controlled food warming cabinet for use on airplanes.

In the serving of food on airplanes, the general practice is to heat the food at the terminal and then load it onto the airplane packed in thermos cabinets. In this type of practice, the food is usually too cool when served and becomes unpalatable. Prior attempts have been made to provide a food cabinet which may be electrically heated by plugging said cabinet into the airplane's electrical system, but such prior cabinets all tend to become almost as hot on the outside as they were inside, thus making them very difficult to handle.

It is the principal object of this invention to provide a cabinet adapted to contain trays of food, wherein the cabinet contains electrical heating elements which may be plugged into the electrical circuit of an airplane.

A further object of the invention is to provide a cabinet according to the preceding object, wherein there is no metal to metal contact between the inner and outer walls.

Another object of the invention is to provide a cabinet as set forth in the preceding objects, wherein a thermostat is provided to control the temperature within the cabinet within predetermined limits.

Still another object of the invention is to provide a cabinet as set forth in any of the preceding objects, wherein food may be placed in the cabinet and heated at the airport terminal, and the cabinet containing the food subsequently may be loaded on an airplane and plugged into the electrical system thereof to maintain said food in its heated condition.

A preferred form of the invention is described in the following detailed specification and illustrated by way of example in the accompanying drawing, wherein:

Fig. 1 is a perspective view of a cabinet embodying the principles of the invention, certain portions thereof being broken away to reveal details of elements hidden therebehind.

Fig. 2 is a sectional view taken on line 2—2 of Fig. 1.
Fig. 3 is a sectional view taken on line 3—3 of Fig. 2.
Fig. 4 is a fragmentary sectional view illustrating the bond between the inner and outer walls.
Fig. 5 is a fragmentary view showing the manner in which the cabinets are adapted to be stacked one on top of the other.

Referring now to the drawings, wherein similar reference numerals are used to denote the same elements throughout the various views shown, 10 generally indicates a rectangular housing having an inner wall 11 and an outer wall 12 spaced therefrom. The space between the inner and outer walls 11 and 12 is filled with insulating material 13. It will be noted from Figs. 2 and 3 that the inner wall 11 is spaced further from the outer wall 12 at the rear of the cabinet than at the sides thereof.

Referring now to Fig. 4, the inner wall 11 is provided with an outwardly extending hook-shaped flange 14 adjacent the front end of the cabinet. The flange 14 extends completely around the opening of the cabinet. Similarly, the outer wall 12 is provided with an inwardly extending hook-shaped flange 15. The flanges 14 and 15 are thus in opposition to each other, but are spaced from each other in the manner shown in the drawing. A ring of plastic material 16 is molded between the inner and outer walls 11 and 12 adjacent the cabinet opening to a depth of approximately one inch. As can be seen in Fig. 4, the flanges 14 and 15 are each embedded in the plastic and thus the walls 11 and 12 are held in spaced relation to each other without any metal to metal contact therebetween. The particular plastic used forms no part of the instant invention, but it should be a plastic which easily bonds itself to metal.

A cover, generally indicated at 17, is adapted to fit tightly over the open end of the cabinet 10 and close the same. The cover comprises an outer rectangular fiberglass member 18 having a downwardly turned right angle flange 19 adjacent each of its sides, and an inner member 20 made of formed fiberglass or the like for insulating the cover. It will be noted that the inner member 20 is bowed inwardly to provide a space 21 between the members which is filled with insulating material.

A semi-circular carrying handle 22 is attached by a suitable hinge structure 23 within a circular recess 24 formed in the top of the cabinet 10, whereby when the handle is laying flat parallel to the upper surface of the cabinet, no portion thereof extends above said surface. Four semi-spherical depressions 25 are provided, one adjacent each of the four corners of the upper surface of the cabinet. Four similarly located semi-spherical projections 26 are provided in the bottom surface of the cabinet, whereby when the cabinets are stacked one on top of another, the projections 26 are received in the depressions 25, in the manner illustrated in Fig. 5, and prevent the cabinets from sliding relative to each other.

A plurality of L-shaped members 27 are fastened with one flange thereof attached to the inner surface of the side portion of the inner wall 11, and the other flange thereof extending horizontally toward the opposite wall. The members 27 are in opposed relation and form guides to slidably support trays of food inserted in the cabinet.

The heating mechanism for the cabinet comprises two heating coils 28 and 29 mounted on the outer surface of the inner wall 11, one on each side portion thereof, a thermostat 30 mounted on one of the side portions of the inner wall 11 on the outer surface thereof adjacent the upper portion of the cabinet, a terminal connection generally indicated at 31, and appropriate wiring not shown in detail. The thermostat is preferably of the type providing approximately a fifteen degree differential, and is designed to open at approximately 180° and close at approximately 165° Fahrenheit. The terminal connection 31 comprises two pins 32 and 33 located in a recess 34 centrally located in the rear bottom corner of the cabinet in the manner shown in Figs. 2 and 3. All of the electrical elements, with the exception of the terminal pins 32 and 33, are embedded in the walls of the cabinet and are attached to to the inner wall 11 and insulated both thermostatically and electrically from the outer wall 12. The electrical elements are designed to be used with a 24 volt D. C. system since this is the type generally available on airplanes.

From the foregoing description it may be seen that I have provided a food warming cabinet which may be plugged into an electrical outlet either in an airport terminal or in an airplane, and which cabinet will keep food placed therein very hot without causing the outer surfaces of the cabinets to become heated so that the cabinets cannot easily be handled.

While I have shown and described the preferred form of my invention, it is to be understood that various changes may be made therein by those skilled in the art, without departing from the spirit of the invention as defined in the appended claim.

Having thus described my invention, what I claim and desire to secure by Letters Patent is:

A food warming cabinet rectangular in shape having an open end and a closed end, an inner wall, an outer wall spaced from said inner wall, heat insulating material packed in the space between said inner and outer walls, a ring of plastic material between said inner and outer walls adjacent the open ends thereof, said plastic being bonded to said inner and outer walls, a rectangular cover adapted to be received over the open end of said cabinet, said cover comprising an outer fiberglass member and an inner member of refractory material spaced therefrom, heat insulating material packed in the space between the outer and inner members of said cover, electrical heating coils embedded between said inner and outer cabinet walls, said heating coils being attached to said inner cabinet wall and spaced from said outer cabinet wall, circuit means between said inner and outer cabinet walls for supplying electricity to said coils, thermostatically actuated means for controlling said circuit means, a two-pronged electrical connection connected to said circuit means and extending externally of said cabinet, said connection being recessed within the external outline of said cabinet, a plurality of depressions formed in the upper surface of said cabinet, and a plurality of projections similarly located in the bottom surface of said cabinet, whereby multiple cabinets may be stacked one on top of another and be interlocked against relative sliding movement.

References Cited in the file of this patent

UNITED STATES PATENTS

| | | |
|---|---|---|
| 1,056,933 | Perkins | Mar. 25, 1913 |
| 1,088,628 | Roberts | Feb. 24, 1914 |
| 1,279,005 | Roos | Sept. 17, 1918 |
| 2,035,757 | Ottenstein | Mar. 31, 1936 |
| 2,466,349 | Anderson | Apr. 5, 1949 |